March 25, 1969     M. J. McKENZIE     3,434,268
EXHAUST GAS FILTER SYSTEM
Filed July 25, 1967     Sheet 1 of 2
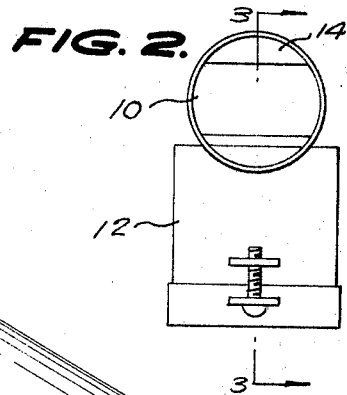
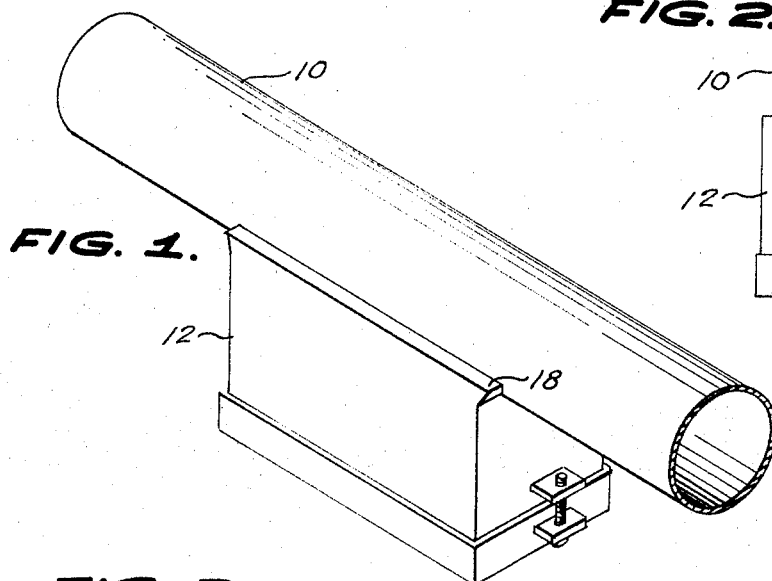
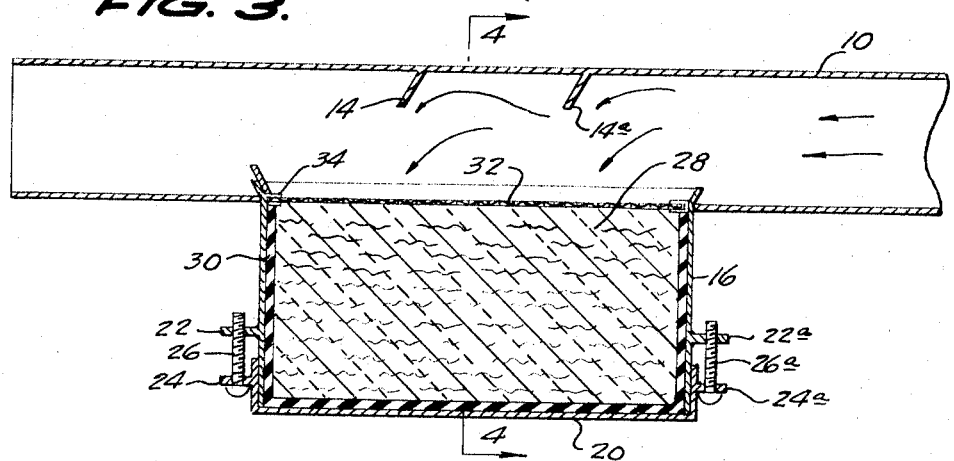
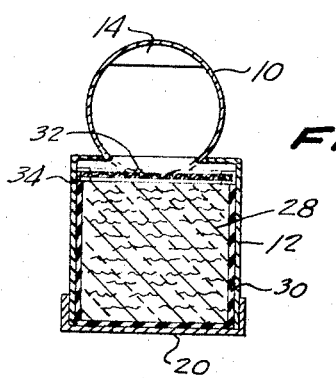
INVENTOR.
MARSHALL J. McKENZIE,
BY
Kimmel, Crowell & Weaver,
ATTORNEYS.

March 25, 1969     M. J. McKENZIE     3,434,268
EXHAUST GAS FILTER SYSTEM
Filed July 25, 1967
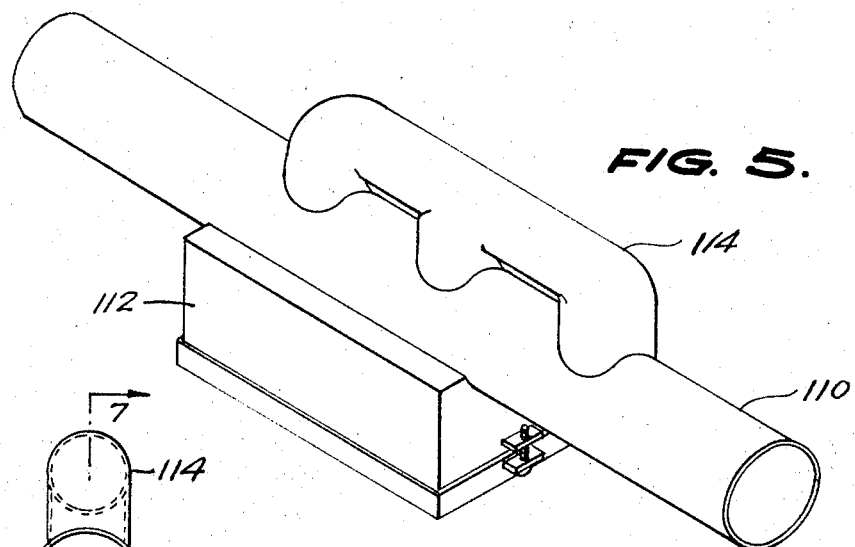
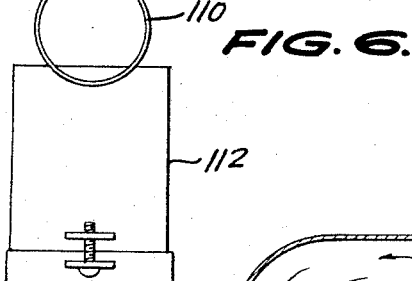
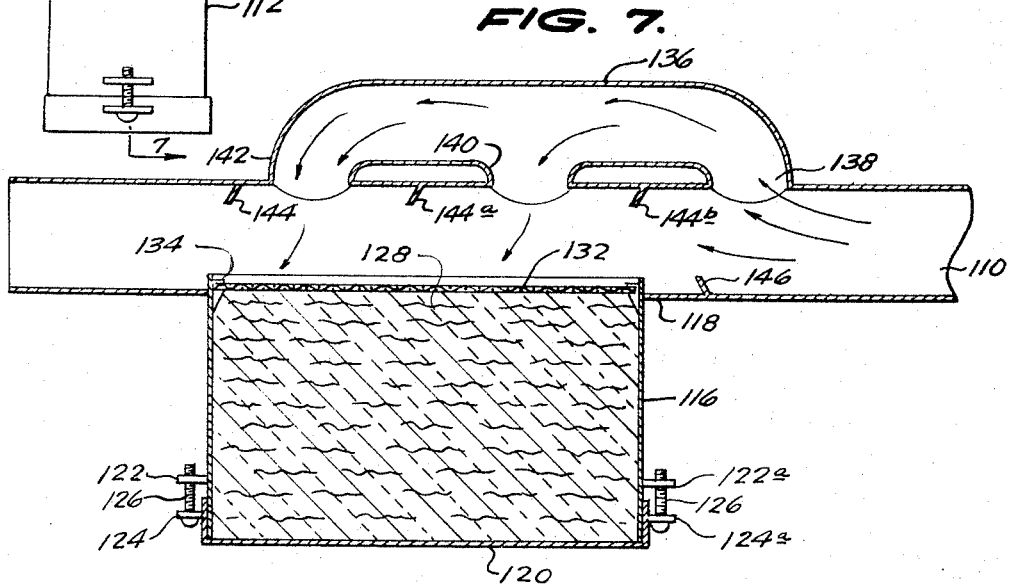
INVENTOR.
MARSHALL J. McKENZIE,
BY Kimmel, Crowell & Weaver
ATTORNEYS.

United States Patent Office 3,434,268
Patented Mar. 25, 1969

3,434,268
EXHAUST GAS FILTER SYSTEM
Marshall J. McKenzie, 1014 S. Massachusetts,
Sedalia, Mo. 65301
Filed July 25, 1967, Ser. No. 655,932
Int. Cl. B01d 53/34
U.S. Cl. 55—418          3 Claims

ABSTRACT OF THE DISCLOSURE

An engine exhaust filter system having a polyethylene glycol coated glass fiber filter cartridge secured together with neoprene in a container secured to the bottom of an exhaust pipe and a conduit for directing the exhaust to the filter are disclosed.

BACKGROUND OF THE INVENTION

Field of the invention

This invention relates to exhaust gas treatment devices and more specifically to a filter for collecting contaminants from engine exhausts.

Description of the prior art

Filters are known in the prior art for entrapping various components of exhaust gas. Such filters are disclosed, for example, in United States Patent No. 1,867,325 issued to Neville; United States Patent No. 1,522,111 issued to Franck Philipson and 2,077,563 issued to Henry. Two major difficulties are encountered with such filters. The first is that filters of the prior art have an excessive back pressure which very significantly decreases the operating efficiency of the engine. Another very grave disadvantage of the devices of the prior art is that they are only poorly or partially effective in collecting the contaminants from the exhaust gases. Therefore, it is a principal object of this invention to provide an improved exhaust gas filter system.

SUMMARY

Without intending to limit the scope of the invention, the present invention briefly comprises a filter container secured to the bottom of the exhaust pipe and a means such as a second conduit for deflecting and passing exhaust gases toward the filter so that contaminants will be entrapped in the filter medium. It is among the principal objects of this invention to provide a novel deflecting construction for passing the exhaust gases to the filter and a novel filter construction and composition.

An additional object is the provision of an improved filter cartridge having a greatly increased filter efficiency.

An additional object is the provision of a second conduit secured to the top of an exhaust conduit for directing exhaust gases to the filter.

Other and more specific objects including the specific disclosure and overall combination will appear from the drawings and from the specification which follows.

BRIEF DESCRIPTION OF THE DRAWINGS

FIGURE 1 is a first embodiment of the present invention shown in perspective.

FIGURE 2 is an end view of the embodiment of FIGURE 1.

FIGURE 3 is a side cross-sectional view of the embodiment of FIGURE 1 taken substantially along lines 3—3 in the direction of the arrows as shown in FIGURE 2.

FIGURE 4 is an end view in cross section of the embodiment of FIGURE 1 taken substantially along lines 4—4 in the direction of the arrows as shown in FIGURE 3.

FIGURE 5 is a perspective view of an alternative and preferred embodiment of the present invention.

FIGURE 6 is an end view of the embodiment of FIGURE 5.

FIGURE 7 is a side view of the embodiment of FIGURE 5 shown in cross section taken substantially along lines 7—7 as shown in FIGURE 6.

DESCRIPTION OF THE PREFERRED EMBODIMENTS

Reference is made first to FIGURES 1 through 4 and principally to FIGURE 1 which shows the overall construction. As will be apparent from FIGURE 1, the present invention is intended for use with an exhaust conduit 10 which may be of conventional size and shape. As well understood in the art, such exhaust conduits are adapted to the type of engine and the type of fuel; thus, large diesel engines require larger exhaust conduits than smaller gasoline engines. It will be further understood that the proportions of the invention will be adapted to the exhaust requirements of the particular engine. The invention comprises a container 12 or a filter which will be disclosed in greater detail hereinafter.

As shown in FIGURES 2 through 4, the invention further comprises deflecting means which may be in the form of fins 14 and 14A secured to the top interior of the exhaust conduit 10. The filter container 12 comprises a housing having sidewalls 16 which are secured as of 18, to the exhaust conduit, the exhaust conduit being open in the bottom for communication with the upper end of the container which terminates adjacent the lower portion of the exhaust conduit and substantially covers the opening formed therein. The container has a bottom 20 which is removable. The bottom is held in place by a pair of ears 22 on the walls 16 and 24 on the bottom 20 which are held together by a screw 26. A similar arrangement indicated at 22A, 24A, and 26A is shown at the other end of the container. It will be understood that this is merely exemplary of a convenient form for securing the bottom to the walls and is not intended to limit the scope of the invention. Any equivalent means may be used, such as over center connectors, ordinary screws, and other conventional fasteners.

A filter material is shown at 20A and is surrounded by a layer of neoprene 30 on three sides, leaving only the top open. The top is covered by a screen 32 for protecting the filter material 28 from large particles or flakes which may be removed from the exhaust conduit 10. Screen 32 is secured in place by keeper 34.

The nature and composition of filter 28 is of very great importance. It must be made of a heat resistant fibrous material and must be coated with a material which is adapted to adsorb and absorb undesirable components from the exhaust products of an engine. In the preferred embodiment, the filter cartridge comprises a mass of fiber glass which is coated with Carbowax 4000 which is Union Carbide's brand of polyethylene glycol of a certain grade. The coating is formed by dissolving the polyethylene glycol in an alcohol solution, and emersing the mass of fiber glass therein. The alcohol is allowed to evaporate thus depositing a layer of polyethylene glycol on each of the fibers. As the exhaust gases pass along the exhaust conduit 10 the filter is heated up and the polyethylene glycol becomes a jelly like substance having extremely effective adsorbing and absorbing properties. It is particularly effective for absorbing hydrocarbon materials such as aldehydes, ketones, etc. which in large part contribute to the undesirable characteristics of the exhaust gases. Other materials such as the combustion products of lead as well as other oxides and other combustion products are also collected in the filter. The filter has been tested and been found to be much more effective than conventional filtering materials such as activated charcoal, etc.

In order for the filter to be conveniently used, it is desirable to make it in the form of cartridge. This is done by coating all the sides except the top of the cartridge with neoprene to form a single integral filter cartridge member. The cartridge may be removed and analyzed for testing purposes in addition to the beneficial effects derived from its filtering action alone.

As the exhaust gases pass along the conduit 10 they are deflected downwardly by the deflecting fins 14 and 14A and the undesirable products therefrom are entrapped in the filter 28 and the air and other innocuous gases pass on out the exhaust conduit.

An improved embodiment of the invention is shown in FIGURE 5, 6 and 7.

As shown in FIGURE 5, the invention comprises the same three major components, an exhaust conduit 110, a filter container 112, and deflecting means 114.

As shown in FIGURE 7, the container is substantially identical comprising walls 116 secured at 118 to the exhaust conduit 110 and having a bottom 120. The bottom 120 is secured in the same manner by means of ears 122 and 124 and screw 126. The same type of filter 128 which may, if desired, include the neoprene outer layer is provided. However, the outer layer of neoprene may be omitted if desired. A screen 132 secured by keepers 134 is provided in the same manner as previously disclosed.

The deflecting means, however, is substantially different and drastically improved. The deflecting means of FIGURE 7 allows substantially all of the gases to pass in contact with the filter with virtually no back pressure. As will be apparent from the drawing, the deflecting means comprises a second conduit 136, spaced vertically above the exhaust conduit 110 and which is secured by conduit means 138 in communication with the exhaust conduit 110 adjacent a first end thereof and at a point before the filter container, in the direction of gas flow. Additional conduit means 140 and 142 are provided in communication with the exhaust conduit for causing the gases in the second conduit 136 to be deflected downwardly substantially directly into the filter. This in turn carries significant portions of the remaining gases in the exhaust conduit into the filter without substantially effecting the back pressure which is inherent in an unobstructed conduit. As is seen in the drawings, the conduits 110 are axially spaced relative to the exhaust and second conduits, 110 and 136, respectively, and are connected thereto to comprise integral parts thereof. These conduits 136 extend transversely with respect to the exhaust and second conduits 110 and 136, respectively, and are disposed above the filter 128. A plurality of deflecting fins 144, 144A, and 144B are secured along the interior top of the exhaust conduit 110 and assisting the deflecting of the gases toward the filter. An important feature of the invention, also, resides in the provision of an upwardly directed fin 146 which tends to channel the exhaust gases upwardly into the second conduit without increasing the back pressure into which the engine must operate.

The filter 128, of course, operates in the same manner and with even greater effectiveness than the filter as previously described.

It will be understood from the foregoing that both of the major disadvantages of the filters of the prior art have been overcome. First, the present filter systems operates with substantially no increased back pressure and consequently, the engine to which the exhaust conduit is attached may operate at maximum efficiency. In addition, the filter is highly effective for the contaminants and undesirable components in exhaust gases.

I claim:
1. In a filter device for trapping contaminents from engine exhaust products comprising:
  an exhaust conduit having an opening in a lower portion thereof;
  a substantially hollow filter container secured to the exhaust conduit, said container having an open upper end in communication with said opening, said upper end extending into said opening and terminating adjacent the lower portion of said exhaust conduit and covering the opening thereof;
  a filter medium in said container being formed of heat resistant Fiberglas having polyglycol coated surfaces and being entirely contained within said container and filling the same substantially to its said open top;
  a second conduit disposed above the exhaust conduit and having an end thereof joined to said exhaust conduit at a point adjacent a first end thereof and communicating with said exhaust conduit; and
  a plurality of conduits axially spaced relative to said exhaust and second conduits, said plurality of axially spaced conduits being connected to said exhaust and second conduits and comprising integral parts thereof, said plurality of axially spaced conduits extending transversely to said exhaust and second conduits and positioned above the filter medium in said container, and said axially spaced conduits serving to deflect a stream of engine exhaust products substantially directly downwardly towards said filter medium.
2. The invention of claim 1 and further including:
  fin means fixedly connected to said exhaust conduit interiorly thereof and adjacent said first end thereof substantially at said point of joining of said second conduit with said exhaust conduit to direct exhaust products upwardly from said exhaust conduit into said second conduit.
3. The invention of claim 1 and further including:
  fin means depending from each of said plurality of axially spaced conduits and into said exhaust conduit for deflecting exhaust products toward said filter medium.

References Cited

UNITED STATES PATENTS

| | | | |
|---|---|---|---|
| 2,299,364 | 10/1942 | Ohlhorn | 55—213 |
| 3,326,198 | 6/1967 | Jackson et al. | 55—309 |
| 1,323,048 | 11/1919 | Goodwin. | |
| 1,522,111 | 1/1925 | Philipson. | |
| 1,867,325 | 7/1932 | Neville | 23—2.2 |
| 1,953,785 | 4/1934 | Sullivan | 55—524 |
| 2,231,076 | 2/1941 | Lake et al. | 55—480 |
| 2,569,575 | 10/1951 | Phillips | 55—524 |
| 2,795,103 | 6/1957 | Jenison | 55—527 |
| 3,108,866 | 10/1963 | Saunders | 55—480 |
| 3,114,617 | 12/1963 | Roue et al. | |
| 3,293,830 | 12/1966 | McKinlay | 55—504 |
| 3,305,509 | 2/1967 | Waterman et al. | 117—162 |
| 2,077,563 | 4/1937 | Henry. | |

HARRY B. THORNTON, Primary Examiner.

BERNARD NOZICK, Assistant Examiner.

U.S. Cl. X.R.

55—478, 502, 524